United States Patent

Hamer et al.

[15] 3,704,395
[45] Nov. 28, 1972

[54] AIRCRAFT ELECTRONIC APPARATUS WITH SUPPORTING RACK

[72] Inventors: William J. Hamer, 201 Brisbane Avenue, Westerville, Ohio 43081; Randal W. Goshen, 3520 Liv-Moor Drive, Columbus, Ohio 43227

[22] Filed: March 15, 1971

[21] Appl. No.: 124,260

[52] U.S. Cl.............317/120, 220/55 K, 317/101 CB
[51] Int. Cl................................................H02b 1/04
[58] Field of Search.........220/3.92, 3.94, 23.4, 55 K, 220/55 Y; 317/99, 101 CB, 101 R, 104, 105, 107, 120

[56] References Cited

UNITED STATES PATENTS 3,437,881   4/1969   Paganelli.....................317/99
3,485,408   12/1969   Benesch...................220/55 K

FOREIGN PATENTS OR APPLICATIONS 921,395   3/1963   Great Britain.......317/101 CB Primary Examiner—Lewis H. Myers
Assistant Examiner—Gerald P. Tolin
Attorney—Cennamo, Kremblas & Foster

[57] ABSTRACT

A mounting arrangement for positioning and maintaining in position a chassis having apparatus thereon in a rack permanently mounted in an aircraft. The chassis/rack for airborne electronic apparatus has a unitized construction exemplified by simplicity of inserting and removing the apparatus from the rack— —but is yet extremely rugged to withstand the most severe vibration in an aircraft. The latching mechanism comprises a spring-like pivot arm mounted inside of the chassis with a circular button with spherical crown on an end protruding from the chassis for fitting into and securing the apparatus in the rack. The chassis and rack are of given sizes to permit a snug fit interlock.

4 Claims, 8 Drawing Figures

PATENTED NOV 28 1972
3,704,395
SHEET 1 OF 3
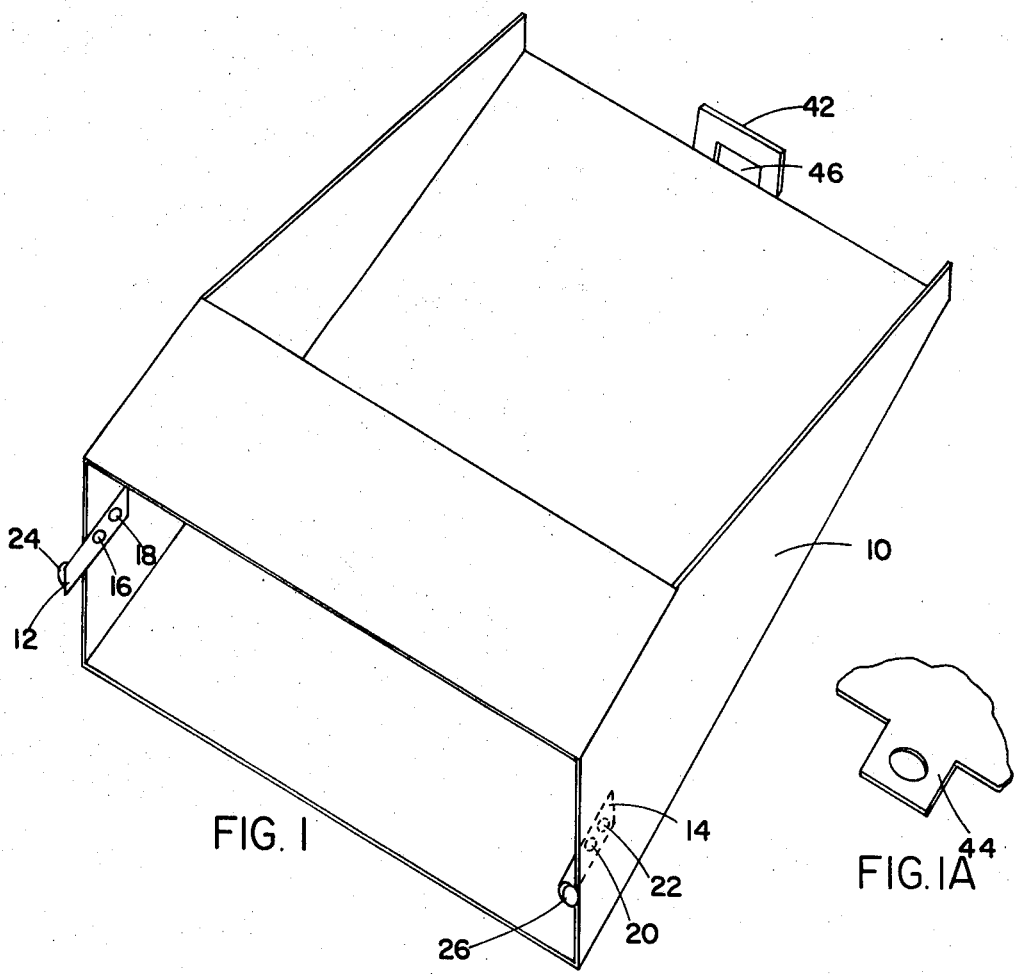
FIG. 1
FIG. 1A
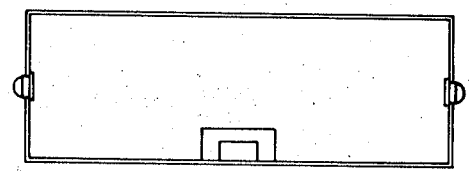
FIG. 2
INVENTORS
WILLIAM J. HAMER
RANDAL W. GOSHEN
BY
Cennamo Kremblas & Foster
ATTORNEYS

INVENTORS
WILLIAM J. HAMER
RANDAL W. GOSHEN

BY

Cennamo Kremblas & Foster
ATTORNEYS

AIRCRAFT ELECTRONIC APPARATUS WITH SUPPORTING RACK

BACKGROUND

It is conventional in aircraft—whether civilian or military use—to prefit the aircraft cockpit panel with racks of a standard size. The reasoning is for simplicity of interchanging the apparatus according to the needs or alternatively for removing the apparatus for maintenance and substitution. The racks per se do not pose any particular problems—they are bolted and securely fastened to the aircraft. The apparatus housed and supported by the racks do pose the problem. In view of excessive vibrations of varying resonant frequencies encountered in an aircraft the fastening and securing means must be sufficiently rugged to assure that the apparatus remains in position; and of equal importance to assure that the interlocking electrical connector is not disconnected.

On the other hand the amount of apparatus carried by an aircraft has its physical limitations. There are frequent occasions when apparatus must be interchanged; there are occasions when the apparatus may be serviced; and there are even occasions when the apparatus must be removed in flight. Accordingly, securely bolting the apparatus to the rack or to the aircraft results in a very cumbersome and wasteful effort. The second problem then is that even though the apparatus is secure, it must be readily removable with a minimum of effort.

SUMMARY OF THE INVENTION

The present invention provides the need for securely positioning and maintaining in position apparatus—primarily electronic apparatus—in a rack mounted in an aircraft. The securing means is of a very simple construction and almost permits the removal of the apparatus as though it were not secured. In placing and securing the apparatus in the rack no action is required by the operator. The apparatus is shoved into the rack and the latching mechanism is automatically operable. To remove the apparatus from the rack a slight press from a single finger of each hand of the operator is all that is required.

Specifically on either side of the rack a spring bar is mounted. The bar has a sufficient length to protrude a given amount beyond the front of the rack. At the end of the spring bar a circular spherical crown push-button is mounted. On the apparatus front panel overlapping sides there is a pair of apertures corresponding to the push buttons.

On insertion of the apparatus into the chassis the push-buttons slip into the apertures and securely hold the apparatus in place. Upon removal of the apparatus the push-buttons are depressed beyond the confines of the aperture and thereby releasing the apparatus from the chassis.

OBJECTS

It is a principal object of the present invention to provide a new and improved latching and locking mechanism for apparatus positioned in a rack permanently mounted in an aircraft.

A further object is to provide such a latching and locking mechanism that is extremely rugged and sufficient to assure permanent positioning—but yet sufficiently simple for ease of operation.

Another object is to provide such a latching and locking mechanism that is relatively simple, low in cost, and manufactured easily.

Other objects and features of the invention will become apparent when taken in conjunction with the drawings, in which:

DESCRIPTION OF THE DRAWINGS

FIG. 1 is a schematic illustration of a rack that is permanently mounted in an aircraft and showing a portion of the present invention;

FIG. 1A illustrates a plug assembly;

FIG. 2 is a front view of the rack of FIG. 1;

DESCRIPTION OF THE PREFERRED EMBODIMENTS

Referring now to the figures, there is shown various aspects of the invention comprising latching and locking means for securely positioning apparatus in an aircraft panel mounted rack. With particular reference to FIG. 1 there is shown a rack 10 of more or less conventional design and adapted to be permanently mounted in an aircraft.

Figure 3:
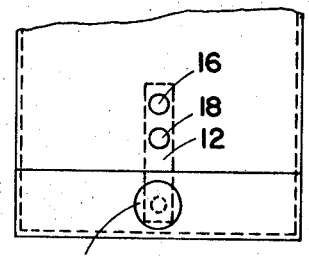
FIG. 3 is a side view of the rack of FIG. 1 further showing in detail the embodiment of the present invention.

Centrally positioned on either side of the inside of rack 10 are spring bars 12 and 14. These bars may be bronze or a high-grade spring steel. The bars 12 and 14 are of length to provide permanent mounting such as at 16 and 18 by rivets and at 20 and 22 on bar 14 also by rivets; and of a length to extend a given amount beyond the end of the rack 10. The extended amount is determined by the position of the apertures 40 and 42 in front panel sides as described hereinafter. On the extended end of the spring bars 12 and 14 are a pair of circular spherical crowned detent buttons 30 and 32 respectively. The buttons 30 and 32 are each fastened to their respective spring bars by riveting the button shank such as shown in the side view of the preferred arrangement of FIG. 3.

Figure 4:
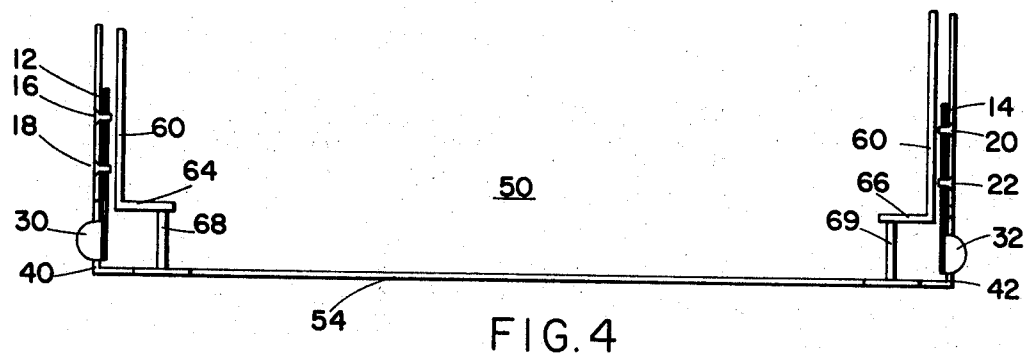
FIG. 4 is a section view of the rack of FIG. 1 together with the apparatus positioned therein with the latching mechanism of the present invention.
Figure 6:
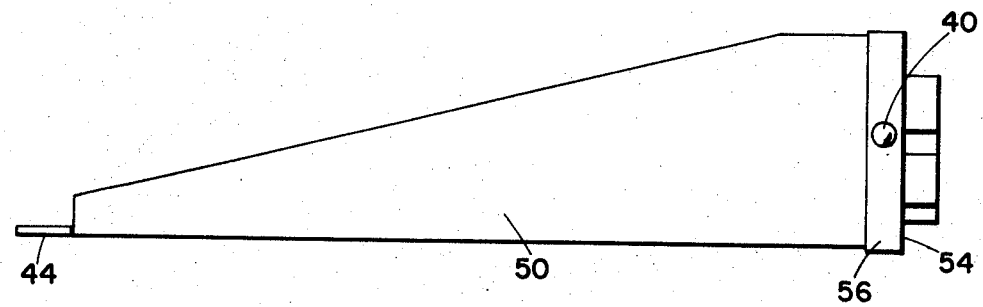
FIG. 6 is a side view of the chassis supporting the apparatus and showing the position of the apertures.
Figure 7:
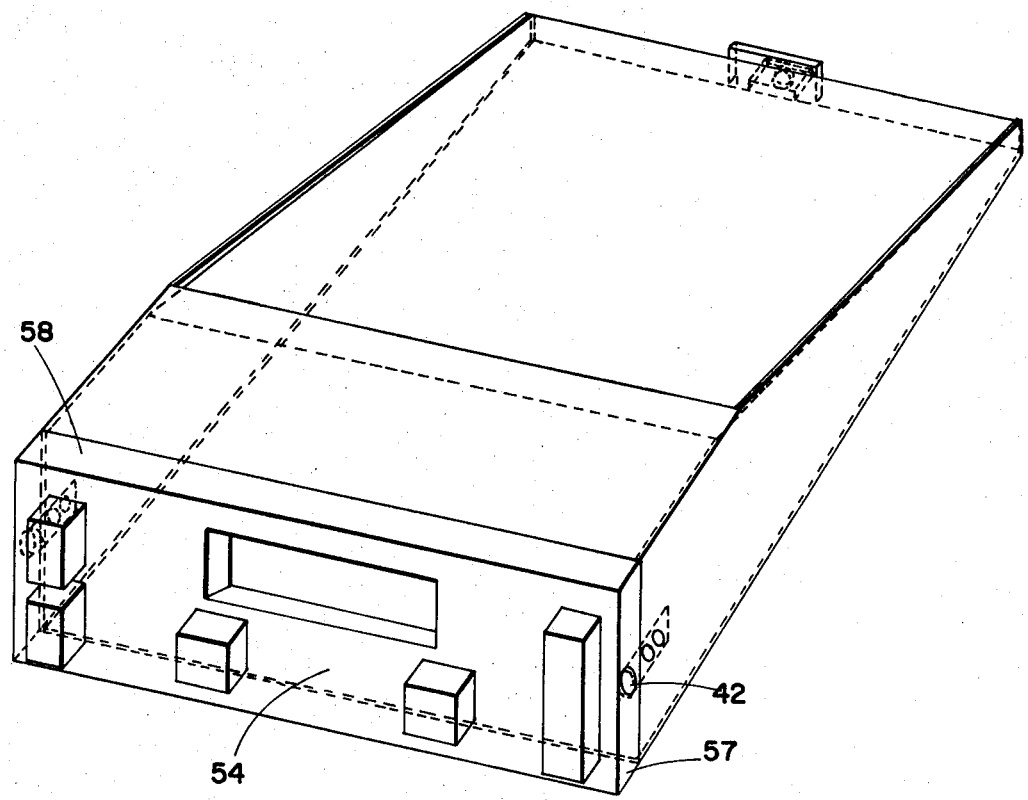
FIG. 7 is an over-all view, in perspective, of the apparatus positioned in the rack mounted on an aircraft panel.

The apparatus—which in most instances will be electronic—is mounted on a chassis 50 shown in FIGS. 6 and 7. The chassis has triangular shaped sides with a flat bottom plate. The shape of the chassis allows for ease of placement. Fixedly mounted on the front of the chassis 50 is the front panel 54. The front panel 54 has four overlapping sides such as shown by top overlap 58 and lefthand overlap 56 and right-hand overlap 57. The front panel 54 has a cross sectional and longitudinal dimension greater than that of the chassis 50. In this way there is a spacing between the chassis 50 outside wall and the inside of the side laps 56 and 57. With reference to FIG. 4 the front panel 54 is shown to be mounted to the sides 60 and 62 of the chassis 50 by way of cross bars 64 and 66 engaging the angled in portions 68 and 69. It is seen in FIG. 4 that the front panel 54 extends beyond the cross dimension of the chassis a length sufficient to permit the sides 56 and 57 of front panel 54 to overlap the detent buttons when the chassis is positioned therein.

In the overlap sides 56 and 57 of the front panel 54 there is positioned an aperture 40 and 42 respectively. The position of the aperture is such to permit the registry and reception of the detent buttons 30 and 32 when the chassis 50 is positioned in the rack 10. The registry of the detent buttons in the apertures is shown explicitly in FIGS. 3 and 4.

Also to be noted in FIG. 4 is that the side walls of the chassis is sufficiently smaller than the inside walls of the rack 10, thereby providing ample clearance for the riveted spring bars 12 and 14.

Figure 5:
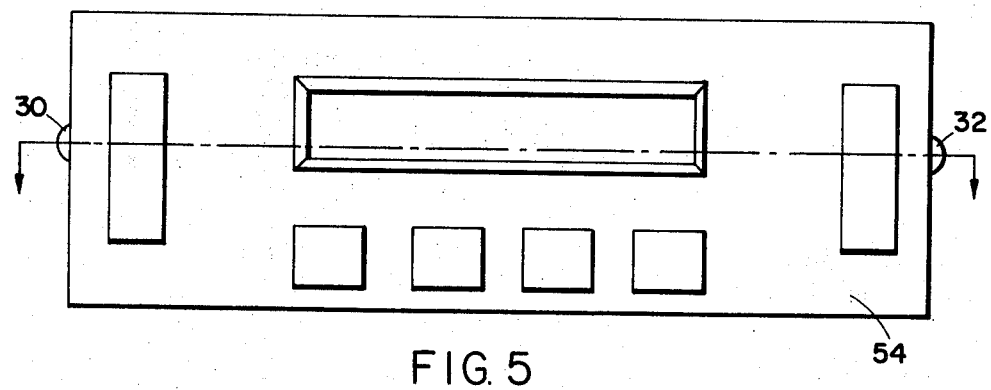
FIG. 5 is a front panel view of the apparatus positioned in the aircraft mounted rack and showing the detent buttons of the present invention.

FIG. 5 is a front panel view and FIG. 6 is a side view and FIG. 7 is a perspective view of the entire combination of the preferred embodiment. From these overall views, it can be seen that the chassis 50 is slidably inserted into the rack 10. When chassis 50 is all the way in the rounded top detent buttons fit and seat themselves in their respective apertures in the overlap sides of the front panel 54. It is noted further that the detent buttons 30 and 32 are spherically crowned with a straight shank portion. In operation then the spherical portion of the detent buttons 30 and 32 permit entry easily into their respective apertures; but once inserted the spring bars 12 and 14 cause the buttons 30 and 32 to make a complete entry. The straight shank portion of the buttons 30 and 32 engage the aperture walls locking the chassis 50 to the rack 10.

Referring now to FIGS. 1, 4, 6 and 7, to secure the chassis 50 in the rack 10 there is fixedly mounted in a central position the female latch 42 on the rack 10. On the inside end of the chassis 50 there is fixedly mounted a male latch insert. The male insert 44 is positioned on the chassis 50 to be fitted into the slot 46 of the female latch 42. Further, the insert 44 has an aperture centrally positioned therein. Locking means may be utilized to lock the chassis 50 into Rack 10. Since the chassis 50, as pointed out above, is smaller in size than rack 10, vibration would occur. The latching mechanism 42-44 further acts to centrally position the chassis in the rack and eliminate lateral movement of the chassis 50 within the rack 10.

Although certain and specific embodiments have been shown, it is to be understood that modifications may be made without departing from the true spirit and scope of the invention.

What is claimed is:

1. A mounting arrangement for positioning and retaining in position an electronic apparatus bearing chassis in a rack permanently mounted in an aircraft comprising:

a rack having side and top walls providing an elongated box-like structure with front and rear open ends, the inside of said sidewalls each having fixedly positioned thereon a length of spring-like metal, said spring metals extending beyond the side fronts of said open end of said rack, a detent button fixedly positioned on each of said extended ends of said spring-like metal;

a chassis with electronic working apparatus having side walls, the cross dimension of said side walls being sufficiently smaller than the inside wall cross dimension of said rack;

a front panel on said chassis, said front panel having overlapping ends and a cross dimension sufficiently great to permit said overlapping ends to align with said side walls of said rack, said overlapping ends of said front panel having an apertures formed therein receiving and seating said detent buttons, a receptacle centrally positioned on the rear open end of said rack; and a plug on said chassis centrally positioned on the rear end thereof positively engaging said receptacle.

2. A mounting arrangement as set forth in claim 1 wherein said plug on said chassis has an aperture therein positively receiving said locking means.

3. A mounting arrangement as set forth in claim 1 wherein said detent button is semicircular in shape.

4. A mounting arrangement as set forth in claim 3 wherein said semicircular shape of said detent button further comprises an extended straight portion.

* * * * *